United States Patent
Burnett

(10) Patent No.: US 6,754,165 B2
(45) Date of Patent: Jun. 22, 2004

(54) DIAMETER REDUCIBLE, MULTIPLE PART OPTICAL DISK

(76) Inventor: Robert C. Burnett, 7512 Windhaven, North Richland Hills, TX (US) 76180

( * ) Notice: Subject to any disclaimer, the term of this patent is extended or adjusted under 35 U.S.C. 154(b) by 67 days.

(21) Appl. No.: 10/055,855

(22) Filed: Jan. 25, 2002

(65) Prior Publication Data

US 2003/0142618 A1 Jul. 31, 2003

(51) Int. Cl.$^7$ ................................................. G11B 7/24
(52) U.S. Cl. ....................................... 369/272; 369/289
(58) Field of Search ................................ 369/77.1, 272, 369/273, 290, 275.1, 275.2, 275.3, 274, 281, 283, 286, 292, 289; 360/99.08, 99.06, 99.05, 2, 135, 137

(56) References Cited

U.S. PATENT DOCUMENTS

| | | | | |
|---|---|---|---|---|
| 4,903,255 A | * | 2/1990 | Sugaya et al. | 369/284 |
| 5,579,296 A | * | 11/1996 | Smith et al. | 369/273 |
| 5,812,519 A | * | 9/1998 | Kawamura et al. | 369/275.1 |
| 5,882,555 A | * | 3/1999 | Rohde et al. | 264/1.33 |
| 5,978,348 A | * | 11/1999 | Tamura | 369/275.1 |
| D447,146 S | * | 8/2001 | Myers | D14/478 |
| 6,304,544 B1 | * | 10/2001 | Pierson et al. | 369/273 |
| 6,400,675 B1 | * | 6/2002 | Everidge et al. | 369/273 |
| 6,424,616 B1 | * | 7/2002 | Al-Askari | 369/289 |
| 6,447,870 B1 | * | 9/2002 | Beck et al. | 428/64.4 |
| 6,511,731 B2 | * | 1/2003 | Clark | 428/136 |
| 6,542,444 B1 | * | 4/2003 | Rütsche | 369/14 |

* cited by examiner

Primary Examiner—David Ometz

(57) ABSTRACT

The present invention is a two-part optical disk with a nested, centrally positioned removable disk in the original configuration the disks comprise two disks removably joined together so as to enable both disks to be readable with a computer disk drive. The two-part optical disk is further configured so as to be separable into independent disks. After separation of the two disks, only data on the formerly nested inner optical disk continues to be accessible by a computer disk drive. Data on the formerly surrounding outer disk is no longer accessible by a computer disk drive. The two-part optical disk has large data storage capability but with separation offers all the advantages of the small disk format: convenient storability, portability and support functionality.

3 Claims, 1 Drawing Sheet

DIAMETER REDUCIBLE, MULTIPLE PART OPTICAL DISK

BACKGROUND OF THE INVENTION

1. Field of the Invention

The present invention relates to the field of optical disks, currently known by those skilled in the art as CDs and DVDs, used as computer programming storage mediums.

2. Relevant Concept

As introductory information that will teach a concept important to the present invention, reference will be made to the advancement of rocket capability and pertinent to the present invention, utilization of "multiple stage" verses single stage configurations.

Early rockets were constructed using single stage designs. To increase performance, the concept of multiple stages and expendable separable parts was implemented advancing the art of rocket design. The concept of multiple expendable parts, and the "less is more", are pertinent to the present invention.

RELEVANT TECHNOLOGY

With computer readable programming devices such as optical disks, the subject of the present invention, have the ability of storing data in the form of lands and pits. Data stored on the optical disk spirals from the center of the disk to the disk's circumference. An optical disk drive generates a tightly focused laser beam to strike the lands and pits on the surface of the disk. Light that strikes a pit is scattered and light that strikes a land is reflected directly back at a detector. By reading the lands and pits, the detector generates electrical voltages, which are matched against a timing circuit to generate a binary stream. The binary stream is in turn read by a computer. The optical disk may be embodied in various forms including erasable optical disks, WORMS (write once, read many) and be either CDs or DVDs and other optical formats yet to be developed.

Optical disks are presently available in two sizes for personal computers, PCs, the 120 mm diameter disk and the 80 mm diameter disk. The smaller 80 mm disk, when further customized to have two opposing parallel sides (see FIG. 2) that maybe, for example only, 50 mm apart, and two opposing radial ends 80 mm apart, approximates the size but not exact shape of a printed paper business card or plastic credit card commonly used in commerce. With the growing proliferation of PCs, a custom shaped optical disk, with (1) traditional business contact information graphically displayed on the non-read side and (2) computer readable data on the read side is gaining favor for introductions due to its computer compatible card size format. It can also readily be understood that this custom disk fits properly in a disk drive, in the palm of a hand, stores conveniently as a business card and is easily transportable in a purse or wallet. It will readily be understood that a card size optical disk, when compared to the data storage capable of a full size disk, has significantly less available memory. Providing the convenience of a card size disk while maintaining large memory capability is the present invention.

Presentations on optical disk often require the memory capacity of the 120 mm disk. But presenters of the complete data, as well as the consumer, may prefer and, for some intended uses, ultimately require the convenient size and portability of the smaller custom shaped optical disk.

There are circumstances, after a presentation has been made requiring the 120 mm disk capability, when only "support data", a small portion of the original data, need remain accessible from the disk. It is understood that the limited "support data" would be positioned near the starting point of the of the disk presentation. This being the case, some of the disks excess diameter size, like a "spent rocket stage", could be considered expendable "useless baggage", and expendable if expendablity were possible.

If an optical disk were comprised of multiple parts, i.e. a minimum of two separable parts, at least one large outer part joined to but separable from a nested smaller centrally located inner part, size reduction through elimination of the most outer disk part would be possible. The smaller disk rendered independent through separation of the two parts would offer advantages and uses not practical or even possible with the larger size disk part attached. As with the elimination of a "spent rocket stage", reduction of disk diameter would be relateable to the statement, "less is more."

Thus, it would be advancement in the art of computer readable programming devices to have an optical disk that, in its original size embodiment, offers not only large memory capability but is also diameter reducible to a second smaller size and capacity disk. An optical disk with separable outer part and nested inner part provides such advantages.

SUMMARY OF THE INVENTION

A two-part optical disk of the present invention comprises an optical disk that, in its original configuration, combines, but is not limited to, two disks, one large surrounding outer disk and one smaller disk nested within and removably connected to a surrounding outer disk. The two disks are sufficiently joined together to, that in the joined configuration, function as a single entity, with both disks readable through a computer disk drive to present a complete data presentation. The inner disk, located within the two-part disk, has an outer diameter smaller than the outer diameter of the larger surrounding outer disk. Separation of the larger outer disk from the smaller central disk is accomplished through opposing pressure applied on the two disks and renders two independent optical disks; (1) a large outer disk and (2) a smaller nested disk which is removable from within the two-part embodiment. The limited data capability of the smaller disk is intended for, but not limited to, support of the former complete data presentation. After removable of the disk that was nested containing the sprocket hole required for engaging properly with a computers disk drive, the outer disk of the formerly combined disk, ceases to be functional in a disk drive. The relatively large size of the outer surrounding disk could not be stored like a standard business card holder nor is it convenient for transport in a purse or wallet and, after separation, is discardable.

The two-part optical disk, with large outer disk and small nested inner disk, combines the advantages of both size disks within one embodiment. The two-part optical disk, in its original joined configuration, provides large memory capability. When only a small amount of the original data is required, the two-part disk is configured to be reducible in size from the large to the small size, through separation and elimination of the large disk that surrounds the nested disk. These and other objects, features and advantages of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of invention may be obtained, a more particular description of the invention summarized above will be rendered by reference to the appended drawings. Understanding that these drawings only provide selected embodiments of the invention and are not therefore to be considered limiting of the scope, the invention will be described and explained with additional specificity and detail through the use of the accompanying drawings in which.

DETAILED DESCRIPTION OF THE PREFERRED EMBODIMENTS

Figure 1:
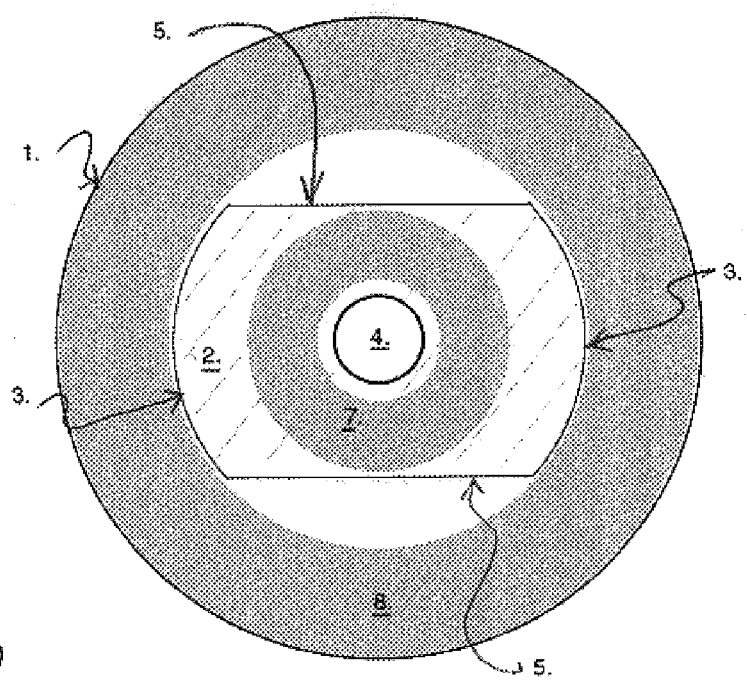
FIG. 1 is a plan view of the two-part optical disk in joined configuration; the large outer disk surrounding the smaller nested, centrally located removable disk with a sprocket hole for proper engagement of the joined optical disks with a computer disk drive.
Figure 2:
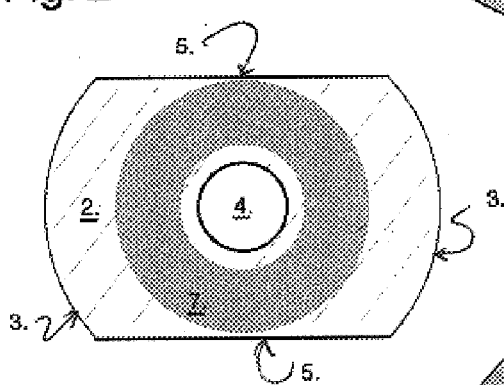
FIG. 2 is a plan view of the smaller disk and engaging sprocket hole, after separation from the outer disk.
Figure 3:
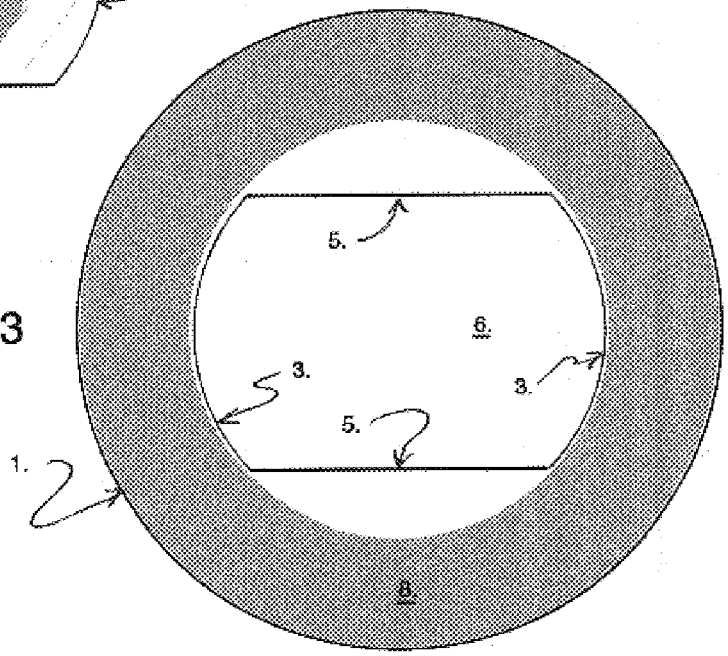
FIG. 3 is a plan view of the resulting large disk after removal of the formerly nested, smaller disk with the disk drive engaging sprocket hole.

The presently preferred embodiments of the present invention will be best understood by reference to FIG. 1 through FIG. 3 wherein like elements are designated by like numerals throughout. Thus, the following more detailed description of the embodiments of the apparatus, system, and method of the present invention, as represented in FIG. 1 through FIG. 3, are not intended to limit the scope of the invention, as claimed, but is merely representative of presently preferred embodiments of the invention.

Referring first to the attached drawings, the two-part optical disk, a surrounding outer disk with nested removable inner smaller disk of the present invention is generally designated and shown as a joined configuration in FIG. 1. Diameters for optical disk parts of the present invention commonly known to those familiar with PC's are first and second diameters of, for example, 120 mm and 80 mm. The outer part of the two-part optical disk of first diameter is indicated as disk 1, and surrounds a removable nested disk having sprocket hole 4, and a second diameter between its opposing radial ends, that is smaller than the diameter of disk 1. Disk 2 with sprocket hole 4 is configured to enable proper engagement with a computer disk drive and allow disk rotation and data readability of both the disk having first and second diameters when the disks 1 and 2 are joined. Optical disk 2, with two opposing radial ends 3 and two opposing parallel sides 5, for example, is the presently disclosed preferred embodiment. Disk 2, while joined to disk 1 or when separated from disk 1, is functional in a disk drive and has both magnetic memory and optical memory capabilities thereon. Its shape enables it to be carried conveniently in the palm of the hand, a wallet, or purse and storable as one would store a business or credit card.

FIG. 1 teaches one of the many possible shapes for disk 1 and 2. The optical disk shape of 1 or 2 may be configured as intended for functional or aesthetic presentation, and, as long as, disks 1 and 2 are joined, computer disk drive compatibility is maintained. When disks 1 and 2 are separated, only disk 2 is configured to remain readable through a computer disk drive.

Numerals 3 and 5 illustrate the lines of separation between disks 1 and 2. Numerals 3 and 5 also define where the limited number of necessary connecting points for attaching the two disks together are located to enable the temporary joining of both disk 1 and 2. It will be readily understood that the two disks of the combined optical disk are attached in a way, well known in the art, to enable ease of separation, one disk from the other, when pressure is intentionally applied to separate the disks.

After separation, of disk 2 from the formerly surrounding disk 1, only data programmed on disk 2, data area 7, will be continue to be readable through a computer disk drive. FIG. 3 teaches the configuration of the resulting discardable, outer disk after separation of disk 2, thereafter 1, minus the formerly nested disk 2. Numeral 6 indicates the void created by disk 2 when 2 has been removed from within disk 1. The resulting disk 1, FIG. 3, without disk 2 containing sprocket hole 4, will no longer engage properly with a disk drive for data retrieval. Data storage area 7, disk 2, is readable by a disk drive both before and after removal from outer disk 1. Data storage area 8 is readable through a computer disk drive only while disk 2, with sprocket hole 4, remains joined to disk 1.

As an example of two-part disk use, a user inserts the single embodiment of the joined disks 1 and 2 into a computer disk drive. Either the data table of content, or user enables bypassing the non-programmable disk area, the area necessitated by the disk separation function of the two-part disk. After separation of the two disks 1 and 2, the outer disk is intended for discard. The resulting smaller disk 2 can be inserted into the computer's disk drive for play back of data in area 7. Incorporated herein by reference to the patent request Ser. No. 09/452,335 dated Nov. 30, 1999, magnetic data on a magnetic stripe may also be applied to disk 2, opposite the side for optical reading, such that 2 with magnetic stripe could function as a credit card.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired to be secured by United States Letters Patent is:

1. An optical disk comprising:

an outer disk part and;

an inner disk parts nested within the outer disk part, where as the outer peripheral edges of the inner disk is adjacent to the inner peripheral edges of the outer disk, and where as said outer disk part and inner disk part are selectively separable (but not re-joinable once separated).

2. An optical disc as claimed in claim 1 where in the inner disc part is generally card shaped.

3. An optical disc as claimed in claim 1 where in the inner disc part is the only disk part to contain(s) an aperture for proper engagement with a rotatable mechanism of a computer disk drive.

* * * * *